United States Patent
Yamaguchi et al.

(10) Patent No.: US 8,736,865 B2
(45) Date of Patent: May 27, 2014

(54) IMAGE PROCESSING APPARATUS AND IMAGE PROCESSING METHOD THAT CAN PRINT AN IMAGE IN WHICH A PATTERN OR SWEEPING PHENOMENON SPECIFIC TO THE ERROR DIFFUSION PROCESS DOES NOT APPEAR

(75) Inventors: Hiromitsu Yamaguchi, Yokohama (JP); Yoshitomo Marumoto, Kawasaki (JP); Hitoshi Tsuboi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 116 days.

(21) Appl. No.: 13/354,859

(22) Filed: Jan. 20, 2012

(65) Prior Publication Data
US 2012/0188582 A1   Jul. 26, 2012

(30) Foreign Application Priority Data

Jan. 25, 2011   (JP) ................................. 2011-012988

(51) Int. Cl.
G06K 15/00 (2006.01)
G06F 3/12 (2006.01)
H04N 1/405 (2006.01)

(52) U.S. Cl.
USPC ....................................................... 358/1.14

(58) Field of Classification Search
USPC ........... 358/1.14, 1.16, 1.18, 3.13, 3.02, 3.03, 358/3.04, 3.05, 3.06, 3.09, 3.1, 3.23, 3.3, 358/501, 515, 517, 522, 524, 534, 540; 345/581, 586, 591, 587, 601, 606, 612, 345/613, 614, 616, 626, 627, 629, 639, 640, 345/643, 672, 571, 596, 597, 89; 347/131; 399/80, 181, 182
See application file for complete search history.

(56) References Cited

U.S. PATENT DOCUMENTS

| | | | |
|---|---|---|---|
| 6,118,547 A * | 9/2000 | Tanioka | 358/1.9 |
| 6,356,361 B1 * | 3/2002 | Ishikawa et al. | 358/1.9 |
| 7,171,019 B2 * | 1/2007 | Miyake et al. | 382/100 |
| 2008/0137146 A1 * | 6/2008 | Marumoto | 358/3.03 |
| 2009/0310150 A1 * | 12/2009 | Marumoto | 358/1.8 |

FOREIGN PATENT DOCUMENTS

| | | |
|---|---|---|
| CN | 1230844 | 10/1999 |
| CN | 1810508 | 8/2006 |
| JP | 2001-333277 | 11/2001 |
| JP | 2004-120133 | 4/2004 |
| JP | 4239939 | 1/2009 |

OTHER PUBLICATIONS

U.S. Appl. No. 13/360,462, filed Jan. 27, 2012.
Chinese Office Action dated Jan. 21, 2014 issued during prosecution of related Chinese application No. 201210021080.X. (Whole English-language translation included.).

* cited by examiner

Primary Examiner — Ngon Nguyen
(74) Attorney, Agent, or Firm — Fitzpatrick, Cella, Harper & Scinto

(57) ABSTRACT

In order to vary a threshold value for performing an error diffusion process depending on a pixel position, a threshold value matrix configured to have pluralities of rows and columns is prepared. In this case, pieces of data in the threshold value matrix are arrayed such that average values in the respective rows and average values in the respective columns are almost the same value. If such a threshold value matrix is used to perform the error diffusion process, the dot sparseness and denseness do not occur with a period of the matrix, and therefore the pattern or sweeping phenomenon specific to the error diffusion can be suppressed.

29 Claims, 22 Drawing Sheets

THRESHOLD VALUE MATRIX (16 × 16)

| 129 | 115 | 116 | 126 | 125 | 132 | 136 | 121 | 120 | 128 | 135 | 122 | 128 | 125 | 138 | 121 |
|---|---|---|---|---|---|---|---|---|---|---|---|---|---|---|---|
| 126 | 136 | 124 | 142 | 113 | 115 | 135 | 130 | 131 | 133 | 127 | 124 | 141 | 123 | 123 | 115 |
| 121 | 126 | 131 | 128 | 132 | 128 | 135 | 139 | 112 | 139 | 119 | 125 | 114 | 121 | 137 | 139 |
| 117 | 116 | 138 | 114 | 120 | 140 | 134 | 118 | 123 | 114 | 141 | 127 | 118 | 118 | 122 | 133 |
| 112 | 136 | 115 | 131 | 138 | 123 | 134 | 127 | 134 | 119 | 133 | 128 | 121 | 116 | 136 | 127 |
| 138 | 126 | 122 | 117 | 127 | 136 | 133 | 136 | 114 | 124 | 125 | 130 | 124 | 114 | 121 | 121 |
| 134 | 116 | 129 | 134 | 115 | 118 | 133 | 115 | 125 | 129 | 117 | 131 | 127 | 141 | 136 | 115 |
| 130 | 136 | 136 | 120 | 133 | 131 | 132 | 124 | 136 | 134 | 140 | 132 | 131 | 139 | 121 | 139 |
| 126 | 127 | 113 | 136 | 121 | 114 | 132 | 132 | 117 | 140 | 132 | 134 | 134 | 137 | 135 | 133 |
| 121 | 117 | 126 | 123 | 140 | 126 | 131 | 141 | 127 | 115 | 124 | 135 | 137 | 134 | 120 | 126 |
| 117 | 137 | 127 | 139 | 128 | 139 | 131 | 120 | 138 | 120 | 116 | 137 | 141 | 132 | 134 | 120 |
| 113 | 127 | 134 | 126 | 116 | 122 | 130 | 129 | 119 | 125 | 138 | 138 | 114 | 130 | 118 | 114 |
| 139 | 117 | 141 | 112 | 135 | 134 | 130 | 138 | 130 | 130 | 130 | 139 | 117 | 127 | 133 | 138 |
| 135 | 137 | 118 | 128 | 123 | 117 | 129 | 117 | 141 | 135 | 122 | 141 | 120 | 125 | 117 | 132 |
| 130 | 128 | 125 | 115 | 141 | 130 | 129 | 126 | 121 | 140 | 114 | 112 | 124 | 123 | 132 | 126 |
| 126 | 118 | 132 | 131 | 129 | 112 | 128 | 135 | 132 | 116 | 136 | 114 | 127 | 120 | 116 | 120 |

16 VALUES × 16 VALUES

FIG.2

|   |   | * | 0.5 |
|---|---|---|---|
| 0.3 | 0.2 | 0.1 | |

COLUMN 1 (FIRST PASS)

↑ ↑
VERTICAL  VERTICAL
STRIPE    STRIPE

COLUMN 2 (SECOND PASS)

↑ ↑
VERTICAL  VERTICAL
STRIPE    STRIPE

FIG.8

COLUMN 1 (FIRST PASS)
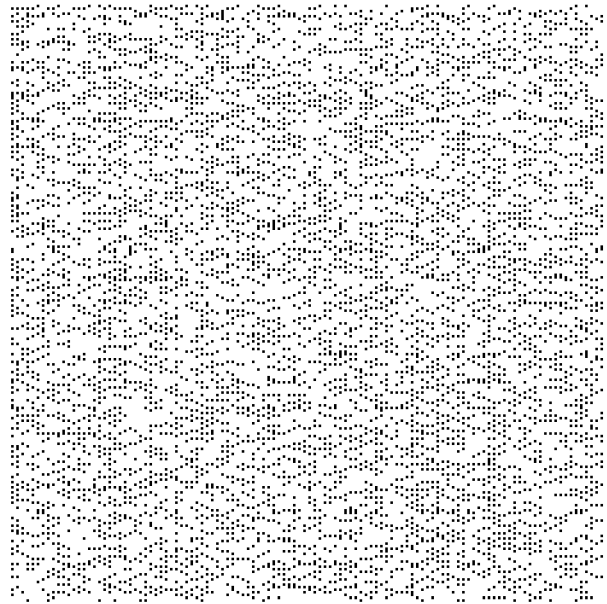
COLUMN 2 (SECOND PASS)
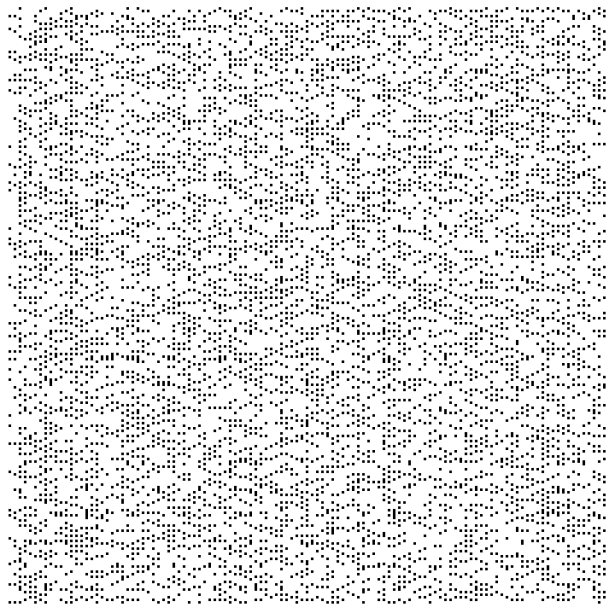
FIG.11

INDEX EXPANSION

| GRADA-TION 0 | GRADA-TION 1 | GRADA-TION 0 | GRADA-TION 1 | GRADA-TION 0 | GRADA-TION 1 | GRADA-TION 0 | GRADA-TION 1 |
|---|---|---|---|---|---|---|---|
| GRADA-TION 1 | GRADA-TION 0 | GRADA-TION 0 | GRADA-TION 0 | GRADA-TION 1 | GRADA-TION 0 | GRADA-TION 0 | GRADA-TION 0 |
| GRADA-TION 0 | GRADA-TION 1 | GRADA-TION 0 | GRADA-TION 1 | GRADA-TION 0 | GRADA-TION 1 | GRADA-TION 0 | GRADA-TION 1 |
| GRADA-TION 1 | GRADA-TION 0 | GRADA-TION 1 | GRADA-TION 0 | GRADA-TION 1 | GRADA-TION 0 | GRADA-TION 1 | GRADA-TION 0 |

FIG.18A

⇩ INDEX EXPANSION

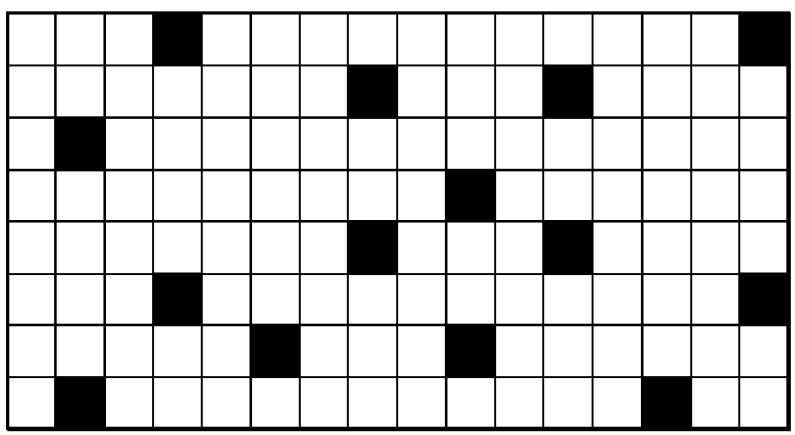

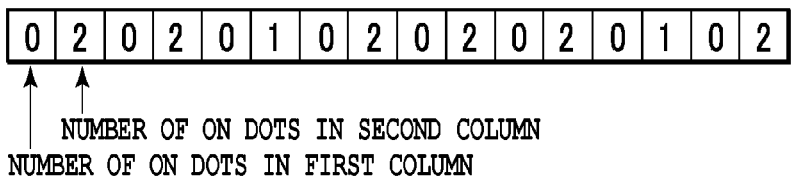

FIRST PASS 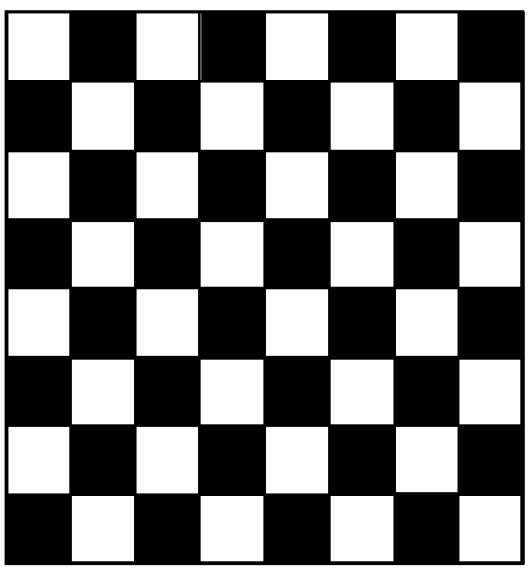  SECOND PASS 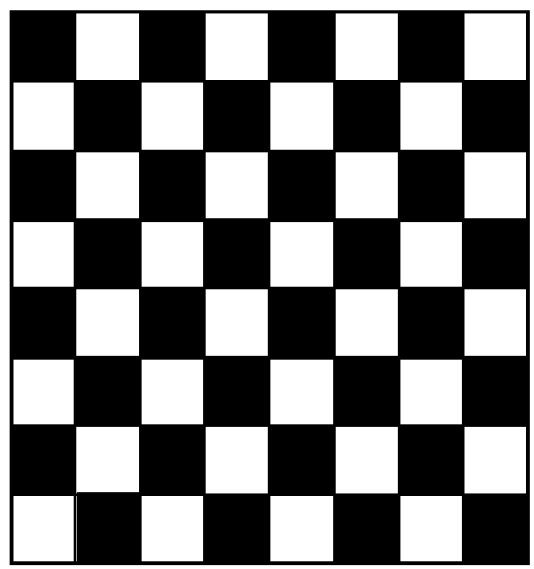
FIG.21

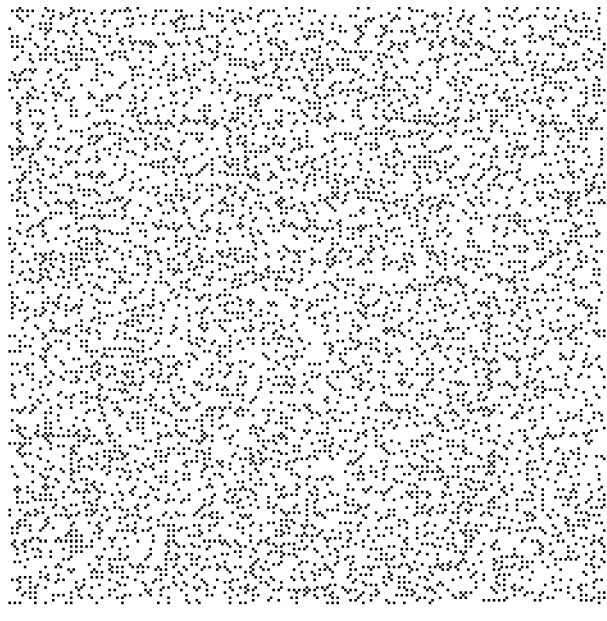
FIRST PASS
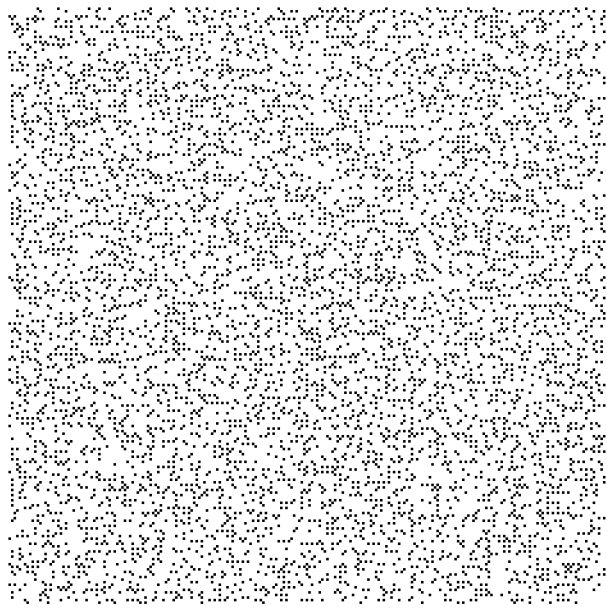
SECOND PASS
FIG.22

IMAGE PROCESSING APPARATUS AND IMAGE PROCESSING METHOD THAT CAN PRINT AN IMAGE IN WHICH A PATTERN OR SWEEPING PHENOMENON SPECIFIC TO THE ERROR DIFFUSION PROCESS DOES NOT APPEAR

BACKGROUND OF THE INVENTION

1. Field of the Invention

The present invention relates to an image processing method. More particularly, the present invention relates to an image processing method that can, even though performing an error diffusion process, print an image in which a pattern or sweeping phenomenon specific to the error diffusion process does not appear.

2. Description of the Related Art

In a printing apparatus that prints an image by printing or non-printing of a dot, a quantization process that converts multivalued density data to binary data indicating printing (1) or non-printing (0) is required. Also, as such a quantization process, an error diffusion process has often been used.

FIG. 1 is a block diagram for explaining a configuration of a typical error diffusion process. Inputted multivalued image data (In) is added with a diffusion error (dIn) from a peripheral pixel by an adder 101 to become an input correction value (In+dIn). Then, the input correction value (In+dIn) is compared with a predetermined threshold value by a comparator 102 to output a value that is binarized into any one of printing and non-printing. For example, in the case where the inputted multivalued image data (In) is a value having 0 to 255, and the threshold value is 128, an output value (Out) of a pixel meeting [input correction value (In+dIn)≥128] is 255 (printing). On the other hand, an output value (Out) of a pixel meeting [input correction value (In+dIn)<128] is 0 (non-printing). At this time, the comparator calculates a difference (error) dOut=(In+dIn)−128 between the input correction value and the output value, and while applying predetermined weighting, stores the resultant in an error buffer 103. The error stored in this manner is, when an unprocessed pixel positioned around is subjected to the binarization process, used as the above diffusion error (dIn).

As described, the error diffusion process compares inputted multivalued image data with a predetermined threshold value to determine printing or non-printing, and is characterized by distributing (diffusing) an error occurring at the time of the determination to an unprocessed pixel positioned around.

However, in a simple error diffusion method as illustrated in FIG. 1, due to a constant threshold value, a specific pattern or sweeping phenomenon may be recognized in a binarized image. Regarding this, for example, Japanese Patent Laid-Open No. 2001-333277 discloses a method that adds random number components to a fixed threshold value to prepare a plurality of different threshold values as a threshold value matrix as illustrated in FIG. 2, and repetitively uses the matrix. Also, Japanese Patent Laid-Open No. 2004-120133 discloses a method that uses a threshold value matrix prepared as in Japanese Patent Laid-Open No. 2001-333277 in not the simple repetitive manner but a rotation manner.

However, in the method disclosed in Japanese Patent Laid-Open No. 2001-333277, the prepared threshold value matrix is repetitively used, and therefore, in an output image, a periodic pattern depending on a size of the threshold value matrix is sometimes recognized. In order to obscure such a periodic pattern, it is effective to increase a size of the threshold value matrix; however, in this case, there occurs a problem of increasing a memory capacity for storing the threshold value matrix.

On the other hand, according to the method disclosed in Japanese Patent Laid-Open No. 2004-120133, the threshold value matrix is not used in the simple repetitive manner, and therefore even in the case of using a relatively small threshold value matrix, a period of the threshold value matrix is unlikely to appear in an image. Accordingly, without influencing a memory capacity, the same effect as that for the case of an increased matrix size can be obtained. Also, even though the same threshold value matrix is used for a plurality of color inks, by changing an amount or direction of the rotation for each of the colors, periodic unevenness in a color image can also be avoided.

However, in the method disclosed in Japanese Patent Laid-Open No. 2004-120133, due to the rotation of the threshold value matrix, the number of times to read the threshold value matrix is increased to increase a load on a rotation process. As a result, image processing speed is reduced to cause a reduction in printing speed of a printing apparatus.

Also, if a multipass printing method is employed for an image that is quantized with use of a threshold value matrix as described above, due to synchronization between a mask pattern used for multipass printing and the threshold value matrix, the occurrence of periodic sparseness and denseness of dots is also sometimes recognized. In this case, even if the multipass printing is performed, sometimes, an effect of the multipass printing is unlikely to appear, or slight displacement of a printed position at the time of the multipass printing makes the above sparseness and denseness significant to cause image deterioration.

SUMMARY OF THE INVENTION

The present invention is made in order to solve the above problems, and an object thereof is to provide an image processing method that performs a quantization process that, without increasing a memory capacity or a load on image processing, with use of a relatively simple configuration, avoids a pattern or sweeping phenomenon specific to error diffusion, or sparseness and denseness of dots at the time of multipass printing.

In a first aspect of the present invention, there is provided an image processing method for performing a quantization process of multivalued image data into a lower level N-value (N is an integer equal to or more than 2) by an error diffusion process, the image processing method comprising: an obtaining step of adding an error from a peripheral pixel to the multivalued image data to obtain a correction value: a setting step of, from a threshold value matrix configured such that different values are arrayed in a row direction and in a column direction, selecting one value according to a pixel position of the multivalued image data to set a threshold value for comparing with the correction value: a quantization step of, according to a result of comparing the threshold value set in the setting step with the correction value obtained in the obtaining step, outputting N-value data; and a diffusion step of diffusing and storing an error between the correction value and the N-value data, the error occurring in association with the quantization step, in a peripheral pixel position where the quantization step has not been performed, wherein in the threshold value matrix, average values in respective rows and average values in respective columns are almost the same value.

In a second aspect of the present invention, there is provided an image processing method for performing a quantization process of multivalued image data into a lower level N-value (N is an integer equal to or more than 2) by an error diffusion process, the image processing method comprising: an obtaining step of adding an error from a peripheral pixel to the multivalued image data to obtain a correction value: a setting step of, from a threshold value matrix configured such that different values are arrayed in a row direction and in a column direction, selecting one value according to a pixel position of the multivalued image data to set a threshold value for comparing with the correction value: a quantization step of, according to a result of comparing the threshold value set in the setting step with the correction value obtained in the obtaining step, outputting N-value data; and a diffusion step of diffusing and storing an error between the correction value and the N-value data, the error occurring in association with the quantization step, in a peripheral pixel position where the quantization step has not been performed, wherein in the threshold value matrix, average values in respective rows and average values in respective columns are included in a range of ±15% of an average value of them.

In a third aspect of the present invention, there is provided an image processing method for performing a quantization process of multivalued image data into a lower level N-value (N is an integer equal to or more than 2) by an error diffusion process, the image processing method comprising: an obtaining step of adding an error from a peripheral pixel to the multivalued image data to obtain a correction value: a setting step of, from a threshold value matrix configured such that different values are arrayed in a row direction and in a column direction, selecting one value according to a pixel position of the multivalued image data to set a threshold value for comparing with the correction value: a quantization step of, according to a result of comparing the threshold value set in the setting step with the correction value obtained in the obtaining step, outputting N-value data; and a diffusion step of diffusing and storing an error between the correction value and the N-value data, the error occurring in association with the quantization step, in a peripheral pixel position where the quantization step has not been performed, wherein in the threshold value matrix, a variation among average values in respective rows and a variation among average values in respective columns are kept low as compared with a case of generating random numbers to prepare the different values.

In a fourth aspect of the present invention, there is provided an image processing apparatus for performing a quantization process of multivalued image data into a lower level N-value (N is an integer equal to or more than 2) by an error diffusion process, the image processing apparatus comprising: an obtaining unit configured to add an error from a peripheral pixel to the multivalued image data to obtain a correction value: a setting unit configured to, from a threshold value matrix configured such that different values are arrayed in a row direction and in a column direction, select one value according to a pixel position of the multivalued image data to set a threshold value for comparing with the correction value: a quantization unit configured to, according to a result of comparing the threshold value set by the setting unit with the correction value obtained by the obtaining unit, output N-value data; and a diffusion unit configured to diffuse and store an error between the correction value and the N-value data, the error occurring in association with the quantization step, in a peripheral pixel position where a quantization step by the quantization unit has not been performed, wherein in the threshold value matrix, average values in respective rows and average values in respective columns are almost the same value.

Further features of the present invention will become apparent from the following description of exemplary embodiments (with reference to the attached drawings).

BRIEF DESCRIPTION OF THE DRAWINGS

FIG. 2 is a diagram illustrating a typical threshold value matrix;

FIG. 4 is a diagram illustrating one example of a diffusion coefficient matrix;

FIG. 6 is a diagram illustrating a threshold value matrix disclosed in Japanese Patent Laid-Open No. 2001-333277;

FIG. 8 is a diagram illustrating pieces of dot data for the case of performing the 2-pass printing of print data in FIG. 7;

FIG. 11 is a diagram illustrating pieces of dot data for the case of performing the 2-pass printing of print data in FIG. 10;

FIGS. 18A and 18B are diagrams illustrating a result of using the index patterns to perform binarization;

FIG. 20 is one example of a threshold value matrix prepared according to the flowchart in FIG. 19;

FIG. 21 is a diagram illustrating another example of mask patterns applicable in the 2-pass multipass printing; and FIG. 22 is a diagram illustrating pieces of dot data for the case of performing the 2-pass printing with use of the mask patterns in FIG. 21.

DESCRIPTION OF THE EMBODIMENTS

Figure 1:
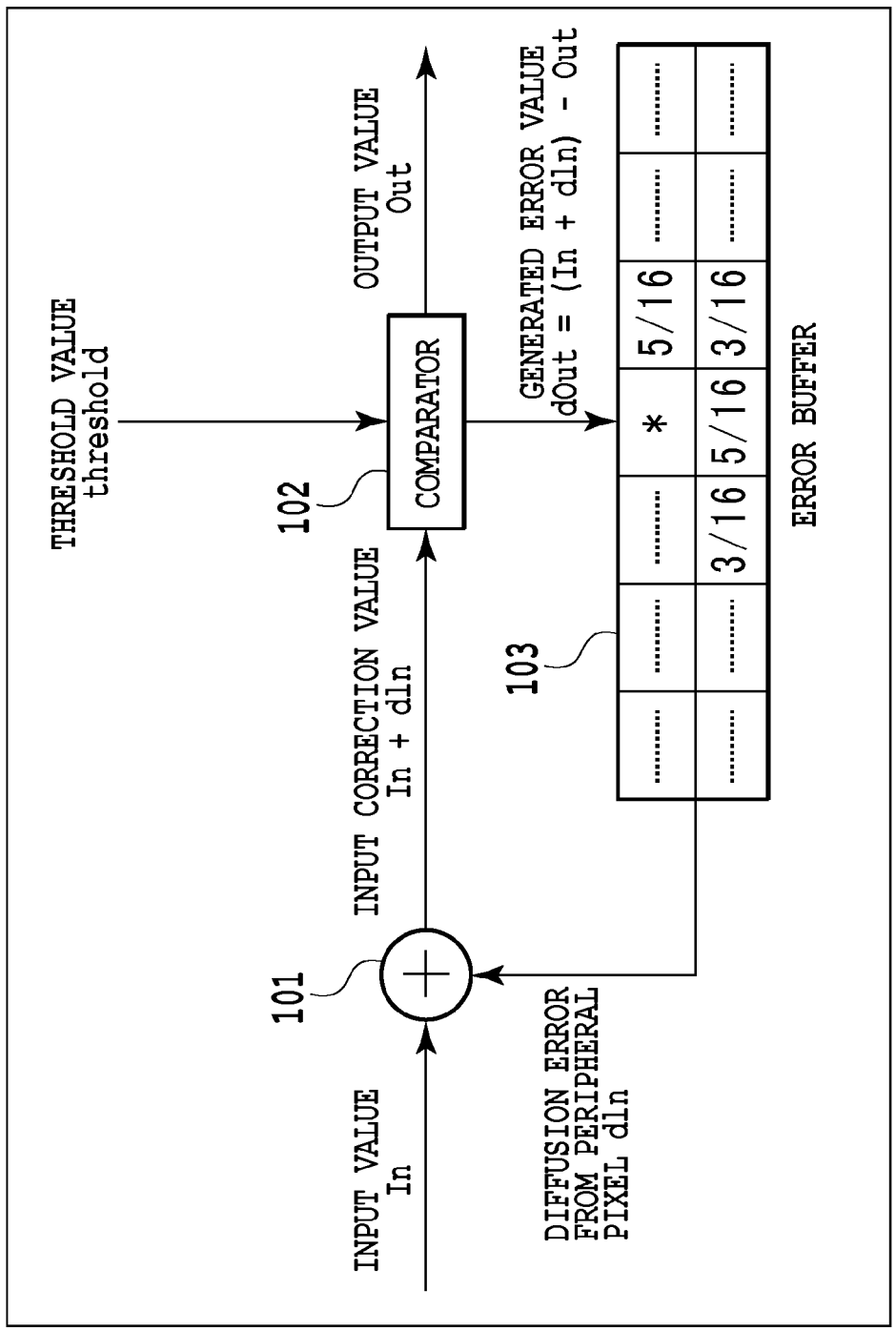
FIG. 1 is a block diagram for explaining a configuration of a typical error diffusion process.
Figure 3:
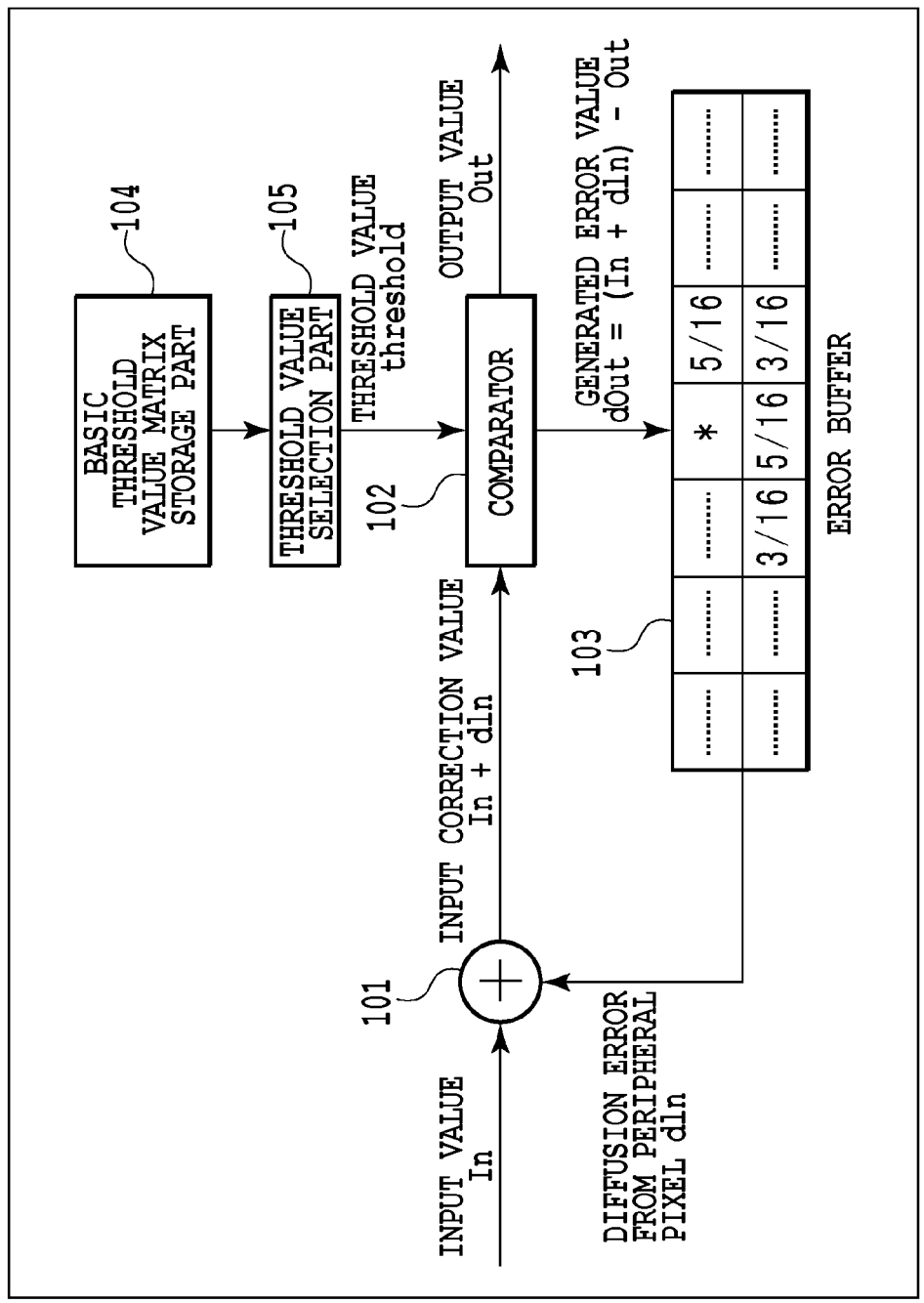
FIG. 3 is a block diagram for explaining a configuration of an error diffusion process in a first embodiment.
Figure 9:
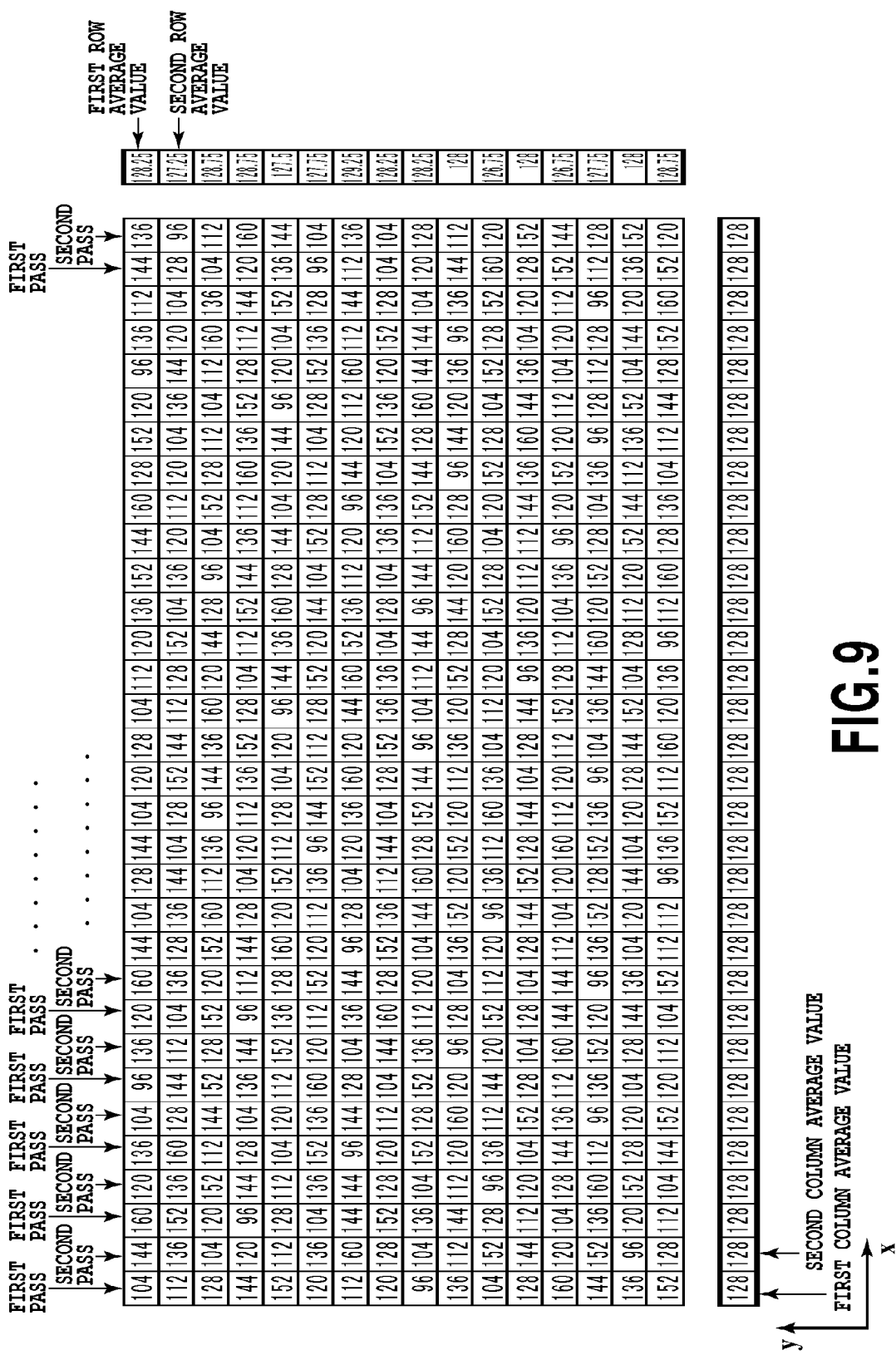
FIG. 9 is a diagram illustrating a threshold value matrix used in the first embodiment.

FIG. 3 is a block diagram for explaining a configuration of an error diffusion process in the present embodiment. A point of difference from the configuration in FIG. 1 illustrated as a conventional example is that, as a unit configured to determine a threshold value used when each pixel is quantized, a basic threshold value matrix 104 and a threshold value selection part 105 are prepared. The threshold value matrix 104 of the present embodiment is, as illustrated in FIG. 9, configured such that for each of pixel areas including main scanning direction 32 pixels×sub scanning direction 16 pixels, a different threshold value is preliminarily set. Detailed content and effect of the threshold value matrix of the present embodiment will be described later.

In the present embodiment, multivalued image data (In) has a value of 0 to 255 represented by 8 bits. An input correction value (In+dIn) added with a diffusion error (dIn) from a peripheral pixel by an adder 101 is compared by a comparator 102 with one threshold value (threshold) selected from the basic threshold value matrix 104 by the threshold value selection part 105. Then, the resultant is outputted as a value that is binarized into any one of printing (255) and non-printing (0). The comparator calculates a difference (error) between the input correction value and the output value, and while applying weighting to the peripheral pixel according to a predetermined diffusion coefficient, stores the resultant in an error buffer 103. As the diffusion coefficient, a value as listed in the error buffer 103 of FIG. 3 can also be used, or a value listed in FIG. 4 can also be used. The error stored in this manner is used as the above diffusion error (dIn) when an unprocessed pixel positioned around is subjected to a binarization process.

Figure 5:
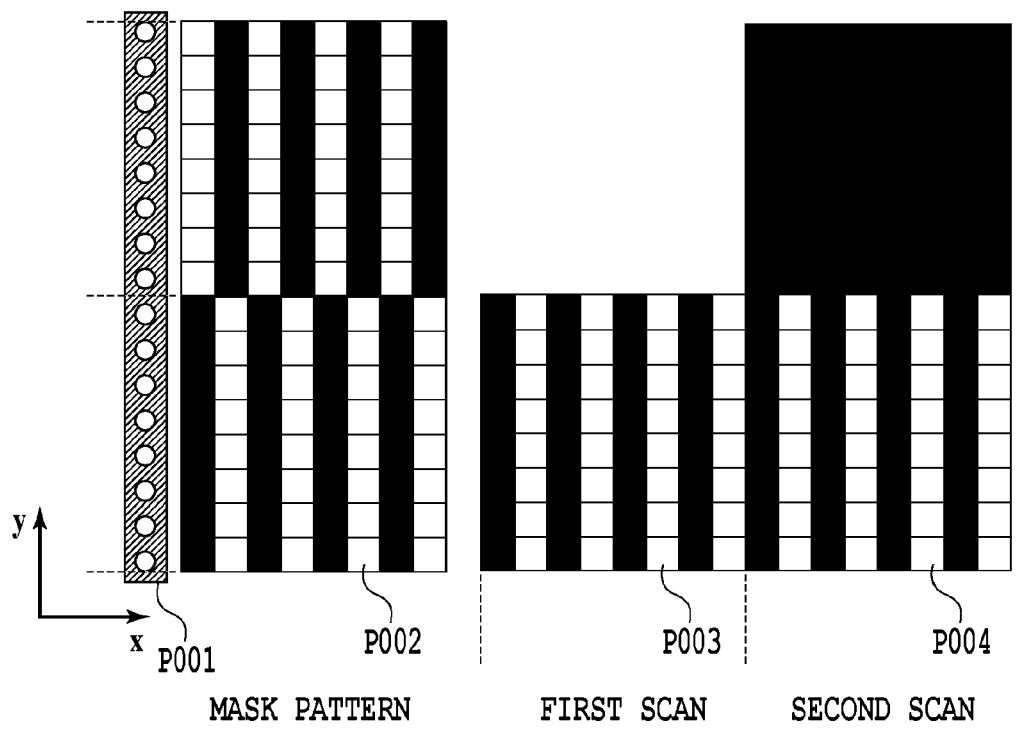
FIG. 5 is a schematic diagram for explaining a 2-pass multipass printing method.

FIG. 5 is a schematic diagram for explaining a 2-pass multipass printing method in a serial type inkjet printing apparatus employed in the present embodiment. In the diagram, P001 represents a print head that ejects ink from respective ejection ports as droplets. Here, for simplicity of description, the print head having 16 ejection ports (hereinafter also referred to as nozzles) is illustrated. In the case of 2-pass multipass printing, it can be considered that the 16 nozzles are, as illustrated in the diagram, divided into first and second nozzle groups each including 8 nozzles.

P002 represents an example of mask patterns that can be used for the 2-pass multipass printing, and for each of the nozzles, a pixel allowed to be printed and a pixel not allowed to be printed are respectively indicated by black and white. The mask patterns respectively used for the first and second nozzle groups have a mutually complementary relationship.

When actual printing is performed, while moving in an x direction in the diagram, the print head P001 ejects ink according to print data. Such print data is determined by performing logical additional operation between binary image data outputted by the above quantization process and binary data on the above mask patterns. After one print main scan has been finished, print medium is conveyed in a y direction in the diagram by an amount equal to a length of 8 nozzles (one nozzle group). Such a print main scan by the print head P001 and the conveyance operation of the print paper by the amount equal to the length of 8 nozzles are repeated, and thereby in a unit area of the print paper, which corresponds to 8 nozzles, an image is completed by two print main scans respectively corresponding to the two mask patterns having the mutually complementary relationship. In the diagram, P0003 and P0004 illustrate a situation where the image is formed by the first and second scans.

In this example, an example of mask patterns in which print allowable pixels are arrayed every other pixel. In printing using such mask patterns, each nozzle does not perform ejection two successive times, and therefore the print head can be moved in the main scanning direction at a speed equal to or more than an ejection frequency achievable by the nozzle. As a result, as compared with a normal mask pattern, printing speed can be increased. In general, in the multipass printing, as compared with one-pass printing, the number of print main scans is increased, and therefore printing speed tends to be lower. However, if mask patterns as illustrated in FIG. 5 are used, a reduction in printing speed can be minimized.

In the following, features and effect of the threshold value matrix in the present embodiment are described.

Figure 6:
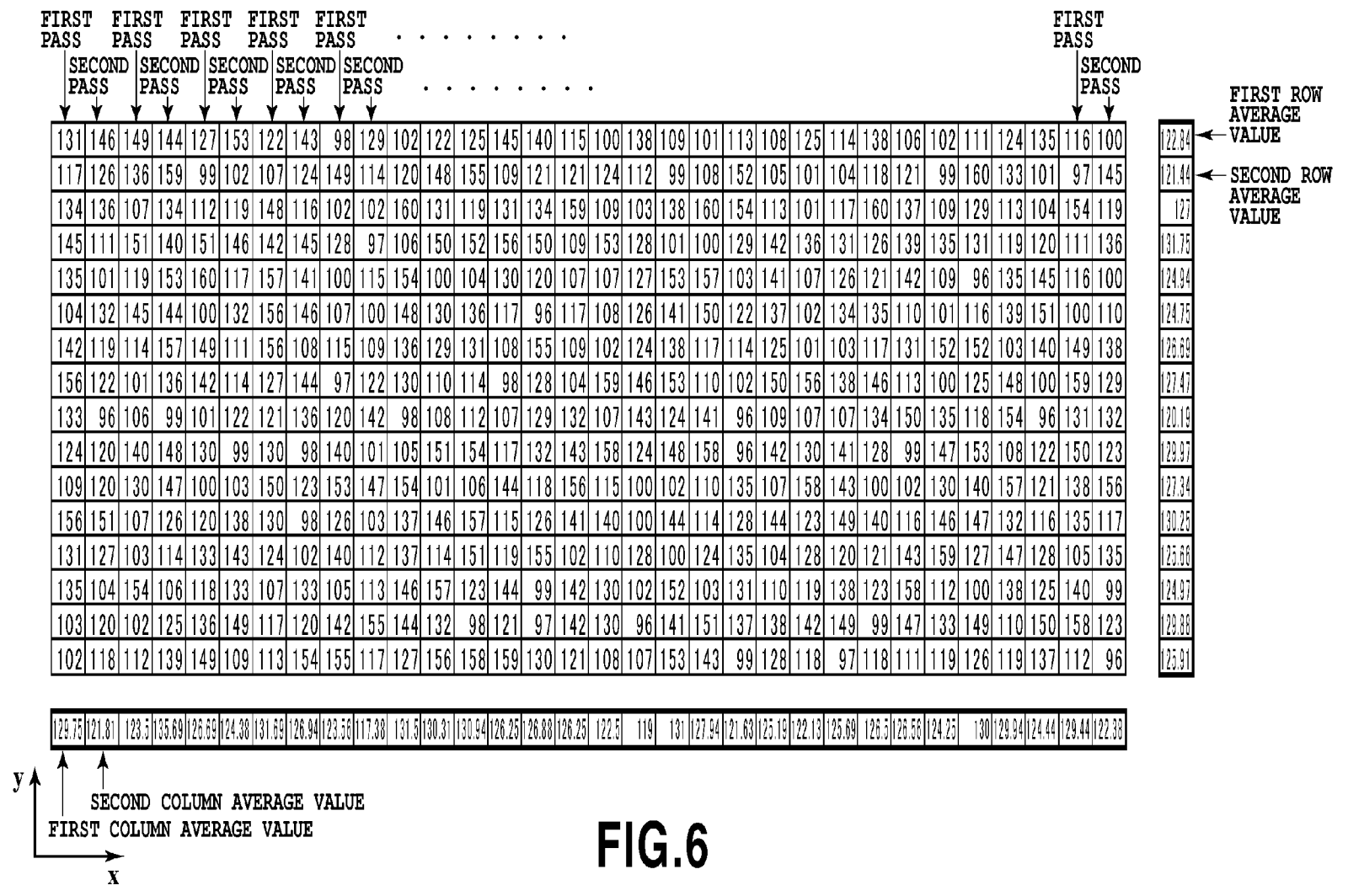

FIG. 6 is a threshold value matrix disclosed in Japanese Patent Laid-Open No. 2001-333277, which is intended to be compared with the threshold value matrix 104 used in the present embodiment. In this case, the threshold value matrix has 32 pixel areas in an x direction (main scanning direction) and 16 pixel areas in a y direction (sub scanning direction). While relating the above threshold value matrix 104 to a pixel position of the image data (In), the threshold value selection part 105 described with FIG. 3 sequentially selects one threshold value from the threshold value matrix 104 for every input pixel. Then, after having selected all threshold values in the threshold value matrix 104, the threshold value selection part 105 is adapted to return again to the head of the threshold value matrix to sequentially relate a threshold value.

In the threshold value matrix disclosed in Japanese Patent Laid-Open No. 2001-333277, an intermediate signal value of 128 is added with random number components to set individual threshold values. In the diagram, on the right and lower sides, an x direction average value in each row and a y direction average value in each column are illustrated. Each of these average values is said to correspond to a print probability of a dot in each row or column. That is, regarding a row (column) of which an average value of threshold values is low, the input correction value is likely to be larger than a threshold value, and therefore the row (column) is one where a dot is relatively likely to be printed. On the other hand, regarding a row (column) of which an average value of threshold values is high, the input correction value is likely to be smaller than a threshold value, and therefore the row (column) is one where a dot is relatively unlikely to be printed. In the case of FIG. 6, the random number components are simply generated to thereby set the individual threshold values, and therefore threshold values in a row or column does not have any mutual relationship. As a result, average values among rows or columns randomly vary.

Figure 7:
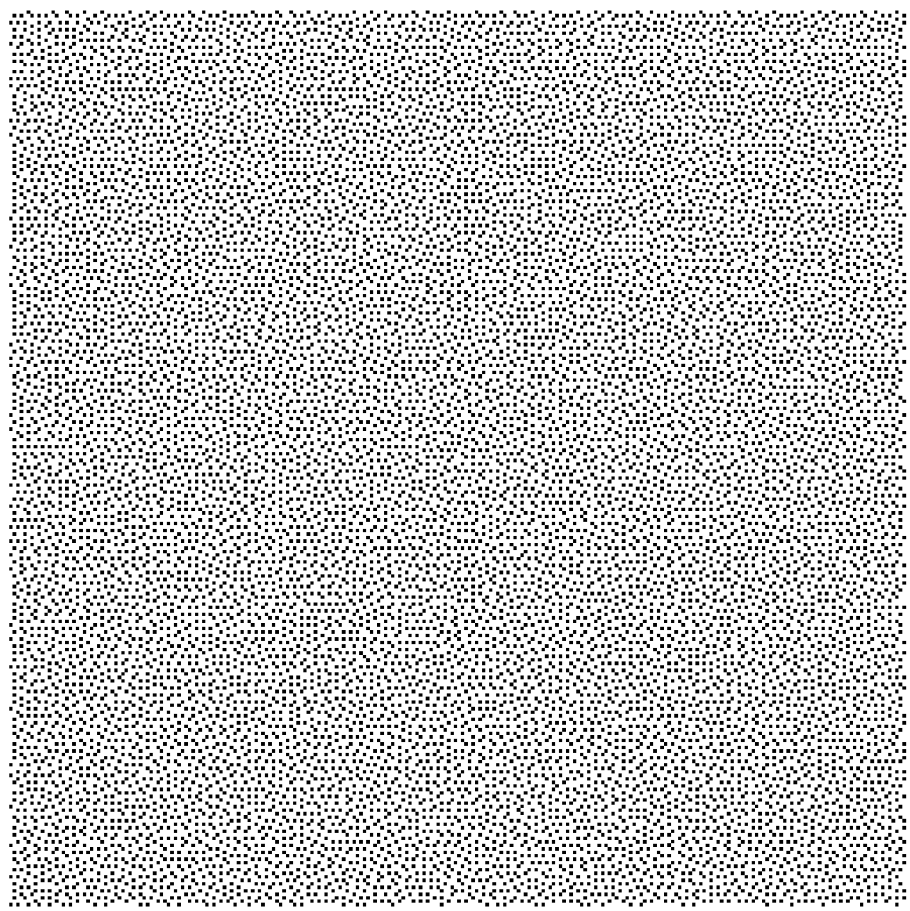
FIG. 7 is a diagram illustrating a result of using the threshold value matrix in FIG. 6 to perform a binarization process.

FIG. 7 is a diagram illustrating a result of using the threshold value matrix in FIG. 6 to perform the binarization process. In print data after the binarization process, a periodic pattern due to repetitively relating the threshold value matrix occurs. This is because in the threshold value matrix, print probability of dot is biased, which causes the occurrence of sparseness and denseness of dots, and the sparseness and denseness are repeated and thereby recognized as the pattern.

FIG. 8 is a diagram in which in the case of using the mask patterns illustrated in FIG. 5 to perform the 2-pass printing of the print data in FIG. 7, dot data printed by the first pass and dot data printed by the second pass are respectively illustrated. In such pieces of dot data, further intense dot sparseness and denseness than that in FIG. 7 are recognized as vertical stripes. This is because in the threshold value matrix of FIG. 6, a variation among the average values in the respective columns is large, which causes the occurrence of a column where a dot is likely to be printed and a column where a dot is unlikely to be printed, and such columns are arrayed to cause the vertical stripes. Further, in the case of performing the multipass printing with use of the pieces of dot data as illustrated in FIG. 8, if between print scans, slight displacement of printed position or displacement of landing position of each dot occurs, the sparseness and denseness are further emphasized, and in a printed image, significant vertical stripes are recognized.

On the other hand, FIG. 9 illustrates the threshold value matrix 104 used in the present embodiment. In the threshold value matrix used in the present embodiment, average values in respective columns in a y direction are all coincident with 128 for all the columns. On the other hand, average values in respective rows in an x direction have a small variation of 127.254 to 128.75. That is, the average values among the respective rows and among the respective columns in the threshold value matrix of the present embodiment are not as varied as those in the threshold value matrix of FIG. 6 in the conventional example.

Figure 10:
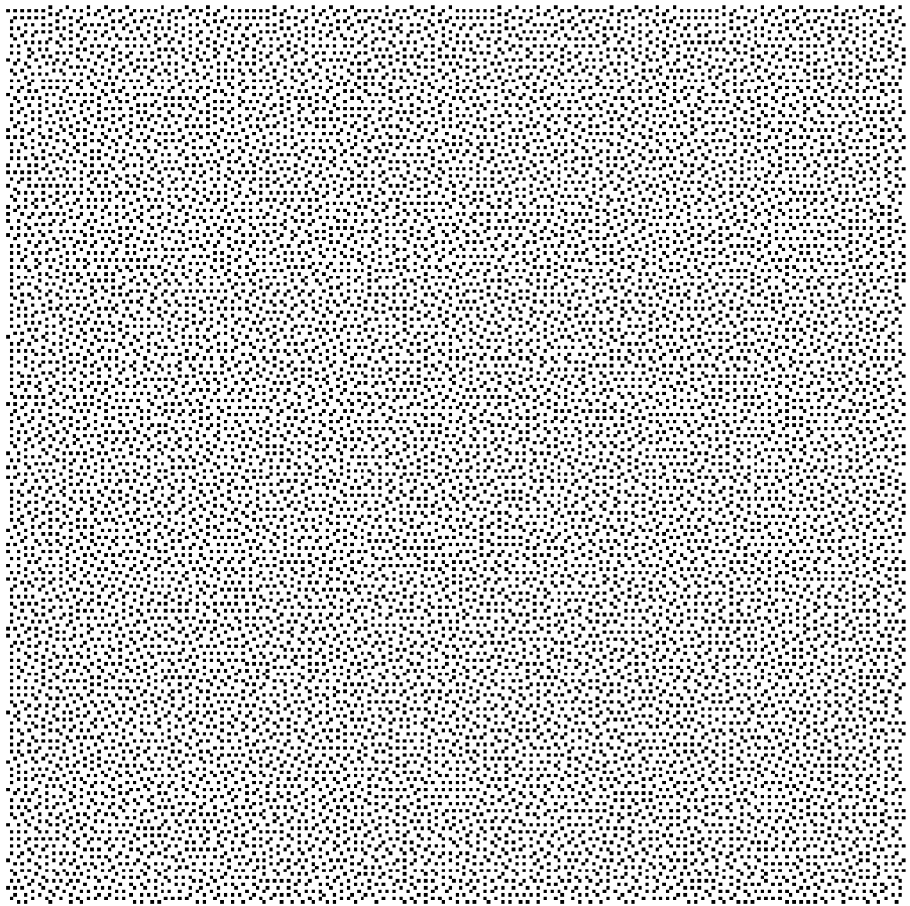
FIG. 10 is a diagram illustrating a result of using the basic threshold value matrix in FIG. 9 to perform the binarization process.

FIG. 10 is a diagram illustrating a result of using the basic threshold value matrix in FIG. 9 to perform the binarization process. In print data after the binarization process, even though the threshold value matrix is repetitively related, a periodic pattern is hardly recognized. This is because print probability of dot is not biased in the basic threshold value matrix, and therefore dot sparseness and denseness do not occur, so that even if the same pattern is repeated, a corresponding period is unlikely to be recognized as a pattern.

FIG. 11 is a diagram in which in the case of using the mask patterns illustrated in FIG. 5 to perform the 2-pass printing of the print data illustrated in FIG. 10, dot data printed by the first pass and dot data printed by the second pass are respectively illustrated. In such pieces of dot data in the present embodiment, the dot sparseness and denseness as recognized in FIG. 8 are not recognized. This is because in the threshold value matrix of FIG. 9, a variation among the average values in the respective columns is absent, and therefore a column where a dot is likely to be printed and a column where a dot is unlikely to be printed do not occur. Accordingly, even in the case of performing the multipass printing with use of the pieces of dot data as illustrated in FIG. 11, slight displacement of printed position or displacement of landing position of each dot between the print scans does not cause the vertical stripes, and therefore a uniform printed image can be outputted.

Figure 12:
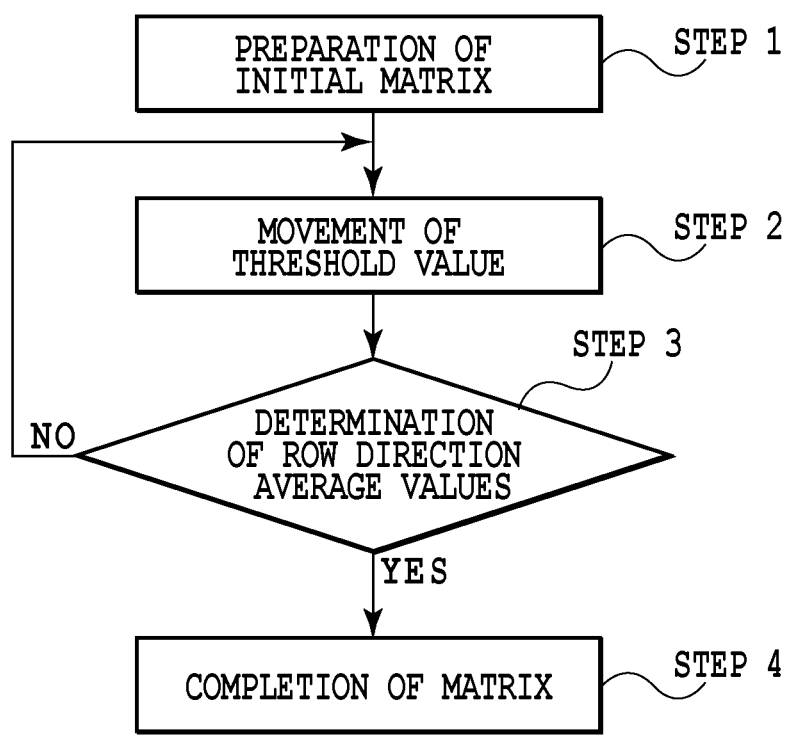
FIG. 12 is a flowchart for explaining a method for generating the threshold value matrix of the present invention.

FIG. 12 is a flowchart for explaining a method for generating the threshold value matrix used in the present embodiment. When this process is started, first, in Step 1, a 32×16 initial matrix is prepared. The initial matrix is prepared with use of values obtained by giving 9-stage noise values (−32, −24, −16, −8, 0, +8, +16, +24, +32) to a reference threshold value of 128. Specifically, from the above 9 types of values, 16 threshold values are selected for each of the columns such that an average value of total 16 pieces of data in each of the column is 128.

Then, in Step 2, with a combination in each of the columns being fixed, values in each of the columns are vertically moved (shuffled) to change a combination in each of the rows. Subsequently, a difference between an average value in each of the rows and the reference value (128) is obtained to calculate a sum of the differences in the total 16 rows.

In Step 3, it is determined whether or not the sum obtained in Step 2 is a minimum value, and if the sum is minimized, the flow proceeds to Step 4 to complete the matrix with present threshold value positions being fixed. On the other hand, if the difference obtained in Step 2 is not minimized, the flow returns to Step 2, where the vertical movement is again made to obtain averages and a sum of differences in next combinations. Such threshold value movement and average value determination are repeated until the above sum of differences becomes equal to the minimum value. In this case, the above minimum value is fixed at a time point when the initial matrix is prepared in Step 1. Specifically, a difference between a value obtained by further averaging the respective averages in the total 16 rows of the initial matrix and the reference value of 128 serves as the above minimum value. In this manner, the threshold value matrix as illustrated in FIG. 9 can be generated.

According to the present embodiment described above, by performing the error diffusion process with use of the threshold value matrix in which the average values in the row direction and the average values in the column direction are set to almost the same value, an image having no pattern or sweeping phenomenon specific to the error diffusion or no dot sparseness and denseness at the time of multipass printing can be outputted with use of a relatively simple configuration.

Figure 4:
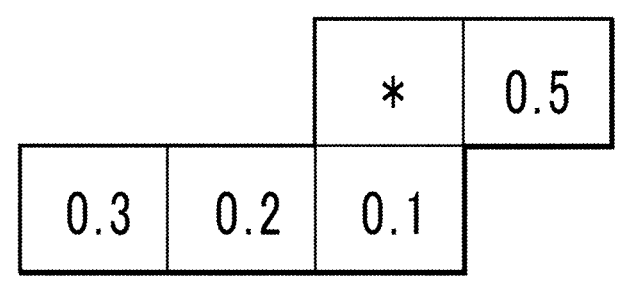

Note that, in the present embodiment, the values obtained by adding the 9-stage noise values (−32, −24, −16, −8, 0, +8, +16, +24, +32) to the reference threshold value of 128 are set as the threshold values; however, the threshold value matrix of the present embodiment is not limited to such a threshold value combination. A range of noise values and a step size are preferably optimally set depending on a diffusion coefficient matrix as illustrated in FIG. 4, print mode of a printing apparatus, dot size, or the like. Also, in the case of using inks respectively having a plurality of colors, an appropriate threshold value matrix may be prepared for each of the ink colors.

A method for generating the threshold value matrix is not limited to the method illustrated in FIG. 9. For example, in the above, the method that prepares the initial matrix having the same average values in the column direction to generally uniform the average values in the row direction is used; however, a method that first prepares an initial matrix having the same average values in the row direction to generally uniform the average values in the column direction is also possible. If, in a completed threshold value matrix, the average values in the row direction and those in the column direction are almost the same value, even if the threshold value matrix is generated by any method, the effect of the present embodiment can be obtained. According to examination by the present inventors, if variations in average values in both of the row and column directions fall within the ranges of ±10% of average values, it is verified that a pattern appearing due to a period of a threshold value matrix is obscure. Also, if the variations in average values in both of the row and column directions fall within the ranges of ±15% of average values, it is verified that stripes occurring at the time of multipass printing are difficult to notice.

Second Embodiment

In the present embodiment, described is image processing for the case of quantizing multivalued (e.g., 256-value) image data to obtain lower level multivalued data (e.g., 4-value) by a multivalued error diffusion process, and then using a prepared dot pattern to convert the lower level multivalued data to binary data.

Figure 13:
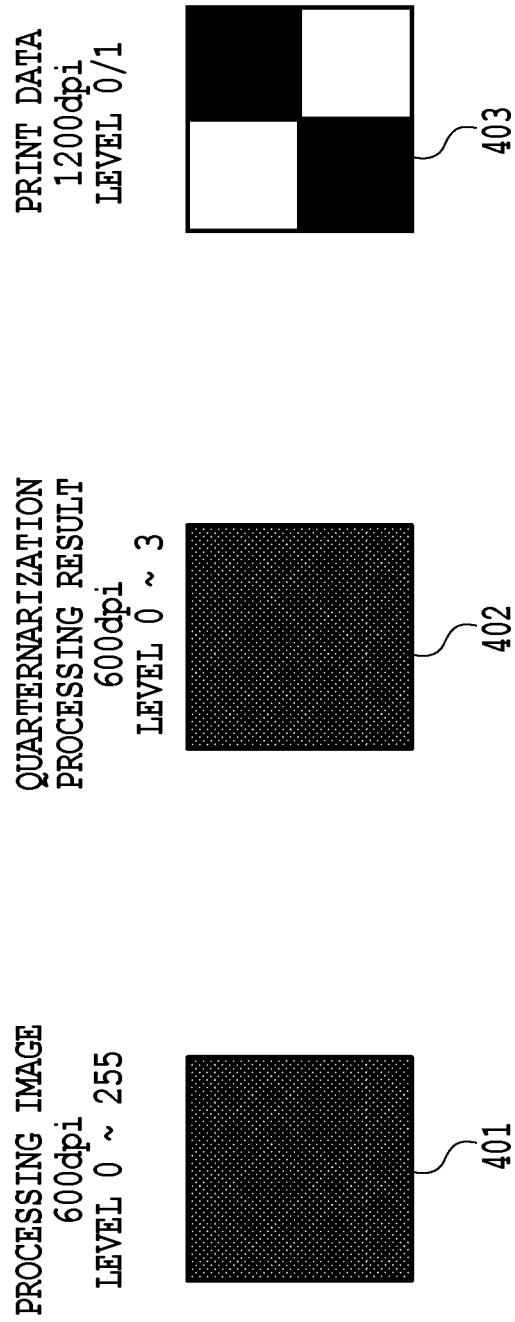
FIG. 13 is a diagram schematically illustrating data conversion of a second embodiment.

FIG. 13 is a diagram schematically illustrating data conversion in the present embodiment. 600 dpi (dot/inch) image data 401 having 8-bit/256-gradation is first converted to 600 dpi image data 402 having 2-bit/4-gradation by the multivalued error diffusion process. Then, by a dot patterning process, the image data 402 is converted to 1200 dpi binary data 403 having 1-bit/2-gradation. If such data conversion is employed, image processing such as the error diffusion process can be performed at a lower resolution (600 dpi) than a print resolution (1200 dpi) of a printing apparatus, and therefore a processing time can be shortened.

Meanwhile, in the multivalued error diffusion process, in order to perform the quantization process, a plurality of threshold values are required. For example, in the case where the multivalued error diffusion process is an N-arization process (N is an integer equal to or more than 2), (N−1) threshold values are required. In the present embodiment, in order to perform an N-arized error diffusion process where N is 3 or more, (N−1)-stage reference threshold values and one threshold value matrix are prepared. Regarding the (N−1)-stage reference threshold values, for example, in the case of quarternarizing a signal value of 0 to 255, three stages of 64, 128, and 192 can be set.

Figure 14:
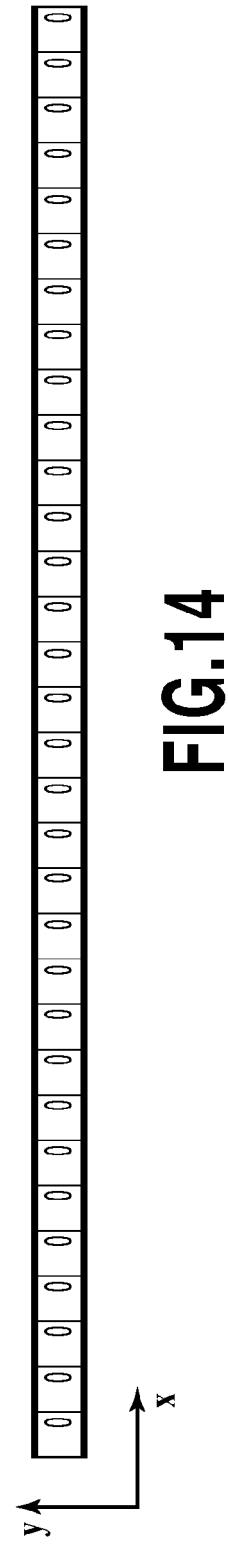
FIG. 14 is a diagram illustrating a threshold value matrix used in the second embodiment.

FIG. 14 is a diagram illustrating one example of the threshold value matrix used in the present embodiment. In the present embodiment, noise components around 0 are stored in the matrix. In the diagram, on the right and lower sides of the threshold value matrix, an x direction average value in each row and a y direction average value in each column are illustrated. Variations in these average values are, as in the first embodiment, said to correspond to variations in dot print probabilities in each row and each column, respectively. In the present embodiment, the y direction average values in the respective columns are all 0. On the other hand, the x direction average values in the respective rows have a small variation of 1.25 to −1.25 around 0. By using such a matrix, variations of dot print probabilities in the row and column directions in each of the reference threshold values can be suppressed.

In addition, even in the present embodiment, as in the first embodiment, the block diagram illustrated in FIG. 3 can also be employed. In this case, in the threshold value matrix 104, only noise component values as illustrated in FIG. 14 are stored. At the time of quantization, the threshold value selection part 105 adds one noise component selected from the threshold value matrix 104 to each of the three reference threshold values (64, 128, 192) to prepare three threshold values, and then passes them to the comparator 102. The comparator 102 compares these three threshold values with the input correction value to output any of values of 0 to 3.

In the present embodiment, the 600 dpi image data having 4-value data of 0 to 3 outputted by the multivalued error diffusion process is then converted to the 1200 dpi binary data that sets printing (1) or non-printing (0). At this time, a plurality of prepared dot patterns are referred to, and the dot patterns corresponding to levels of respective pixels are selected one by one.

Figure 15:
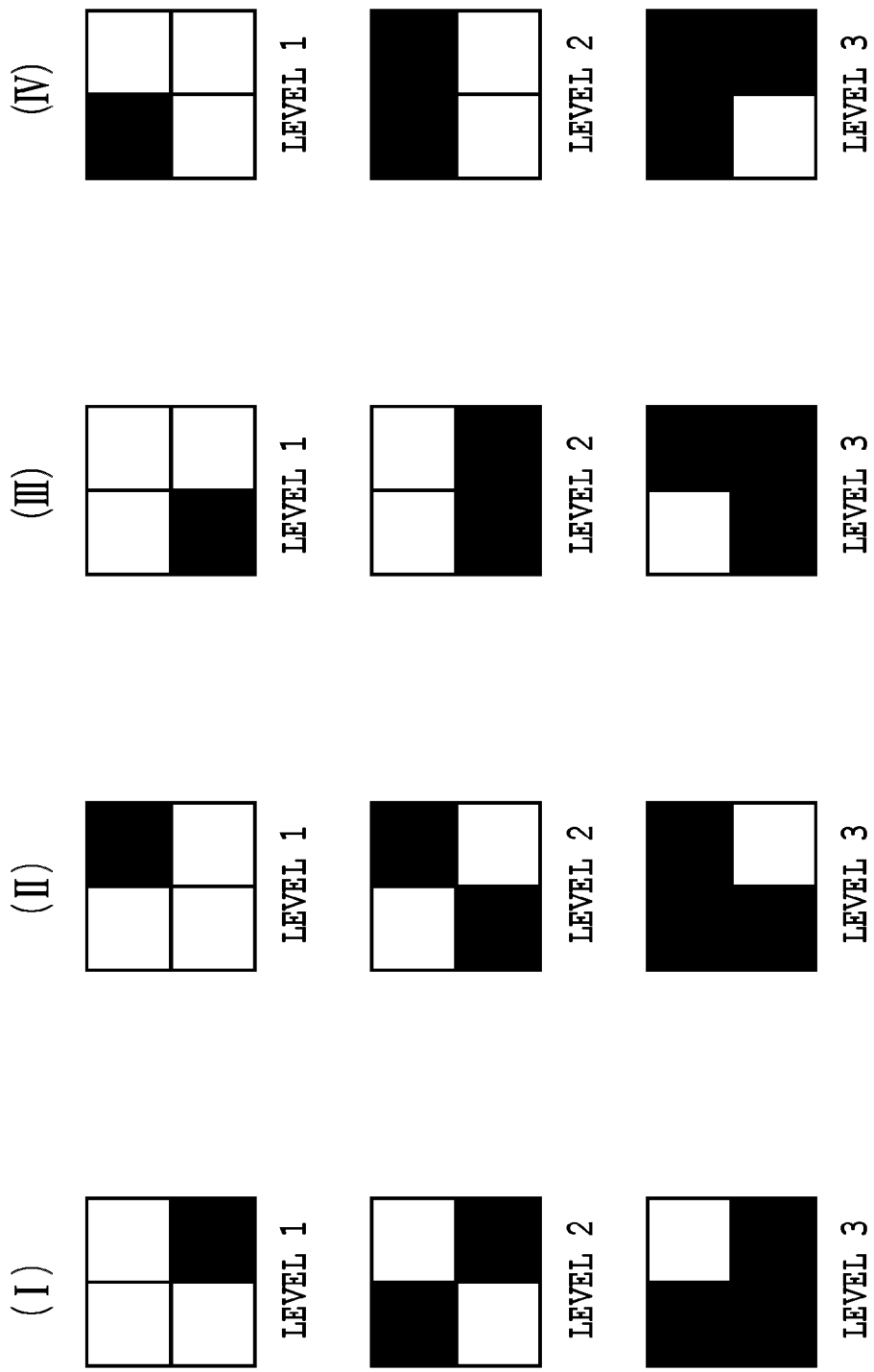
FIG. 15 is a diagram illustrating dot patterns used in the second embodiment.

FIG. 15 is a diagram illustrating dot patterns used in the present embodiment. Four areas formed by 2×2 correspond to one 600 dpi pixel, and each 1×1 area corresponds to one 1200 dpi pixel. In the diagram, an area indicated by black and an area indicated by white represent a pixel printed with a dot and a pixel not printed with a dot, respectively. It turns out that as a level value is increased, the number of areas each printed with a dot increases. In the present embodiment, four dot patterns (I) to (IV) are prepared for each of the levels, and even in the case where the same level continues, different patterns are sequentially used.

Figure 16A:
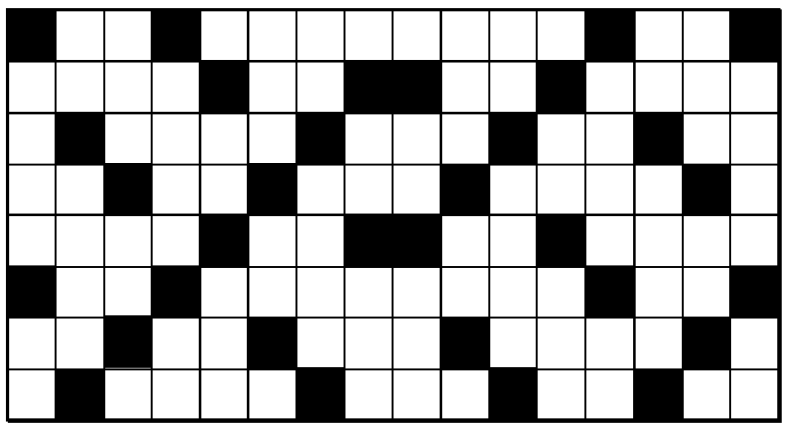
FIGS. 16A and 16B are diagrams illustrating a result of using the index patterns to perform binarization.
Figure 16B:

FIGS. 16A and 16B are diagrams illustrating a result of binarizing the result of the multivalued error diffusion process with use of the index patterns in FIG. 15. Here, FIG. 16A illustrates the case where all 600 dpi pixels are quantized into a level 1. In the case where the all 600 dpi pixels have the same level as described, if only one type of dot pattern (e.g., (I) in FIG. 15) is prepared, dot printing may be biased to any one of odd-numbered columns and even-numbered column, or any one of odd-numbered rows and even-numbered rows. However, if the four types of dot patterns as illustrated in FIG. 15 are sequentially allocated in the row direction and the column direction, as illustrated in FIG. 16B, the dot printing can be suppressed from being biased to any one of odd-numbered columns and even-numbered column, or any one of odd-numbered rows and even-numbered rows. In FIG. 16B, on the right and lower sides of the pieces of binary data, sums (the numbers) of printed dots in each of the rows and each of the columns are indicated. As is also clear from the diagram, the numbers of printed dots in the respective rows are the same, i.e., 4, and the numbers of printed dots in the respective columns are the same, i.e., 2. As described, in the present embodiment, by preparing the plurality of dot arrangement patterns, dots can be suppressed from being biased in the 600 dpi pixels with corresponding to the level values set by the multivalued error diffusion process.

However, in the case of using the conventional threshold value matrix to perform the multivalued error diffusion, among the respective 600 dpi rows and among the respective 600 dpi columns, variations are included in average values of the threshold value matrix.

Figure 17:
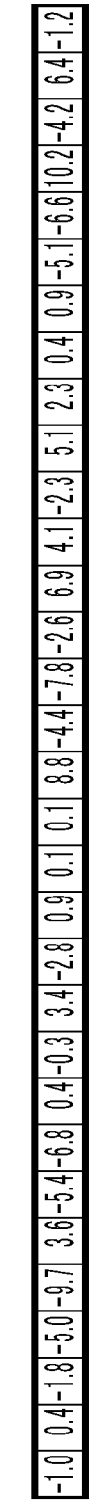
FIG. 17 is a diagram illustrating one example of a threshold value matrix prepared by a conventional method.

FIG. 17 is a diagram illustrating an example of a threshold value matrix prepared by the conventional method, which is intended to be compared with the second embodiment. Noise components prepared by generating random numbers are stored in the matrix. Y direction average values in respective columns and x direction average values in respective rows have large variations as compared with the threshold value matrix of the present embodiment illustrated in FIG. 14. That is, a row or column of which a level value is likely to increase or decrease is inevitably generated.

FIGS. 18A and 18B are diagrams illustrating a result of using the index patterns in FIG. 15 to binarize a result of using the threshold value matrix illustrated in FIG. 17 to perform the multivalued error diffusion process. In this case, rows and columns of which level values originally tend to be high, and rows and columns of which level values originally tend to be low are irregularly arranged, and therefore even in the case of using the dot patterns as illustrated in FIG. 15 to suppress dots from being biased in 600 dpi pixels, sparseness and denseness of dots in a wider range cannot be suppressed. As a result, as seen in FIG. 18B, the numbers of printed dots in respective 1200 dpi columns, and the numbers of printed dots in respective 1200 dpi rows are both in a biased state.

As described, in the present embodiment, the multivalued error diffusion process using the threshold value matrix in which the average values in the respective rows and the average values in the respective columns do not include any variation, and the binarization process using the plurality of dot patterns as illustrated in FIG. 15 are collaboratively operated to thereby preferably disperse the dots.

Note that, in the above, the description is provided with use of the example of using the 2×2 dot patterns to binarize the data quarternarized by the multivalued error diffusion; however, the present embodiment is not limited to such a configuration. If the present embodiment is configured to be able to quantize multivalued image data into lower level N-value, and then use m×k dot patterns to make conversion to binary data that meets a print resolution of a printing apparatus, the present embodiment is capable of responding even if N, m, and k respectively have any values.

Also, the noise components used when the threshold value matrix is prepared have the values obtained by adding the 9-stage noise values (−32, −24, −16, −8, 0, +8, +16, +24, +32) to the reference value of 0; however, they are not limited to the values obtained by such a combination. As in the first embodiment, a range and a step size of noise values are preferably optimally set depending on a diffusion coefficient matrix used in the error diffusion process, print mode of a printing apparatus, dot size, or the like. Also, in the case of using inks respectively having a plurality of colors, an appropriate threshold value matrix may be prepared for each of the ink colors.

Other Embodiments

In the above, the first embodiment is described so that the threshold value matrix storing the threshold values is prepared, and the second embodiment is described so that the noise components corresponding to the reference value are prepared as the threshold value matrix; however, it should be appreciated that such configurations do not limit the present invention. The first embodiment may also be configured to prepare one threshold value matrix storing only noise components for one reference value of 128. In this case, it is also effective to prepare a different noise component matrix for each ink color for the one reference value of 128. On the other hand, the second embodiment may also be configured to prepare (N−1) types of threshold value matrixes storing not noise components but threshold values to thereby perform quantization into an N-value.

Also, a method for generating the characteristic threshold value matrix of the present invention is not limited to the flowchart described with FIG. 12.

Figure 19:
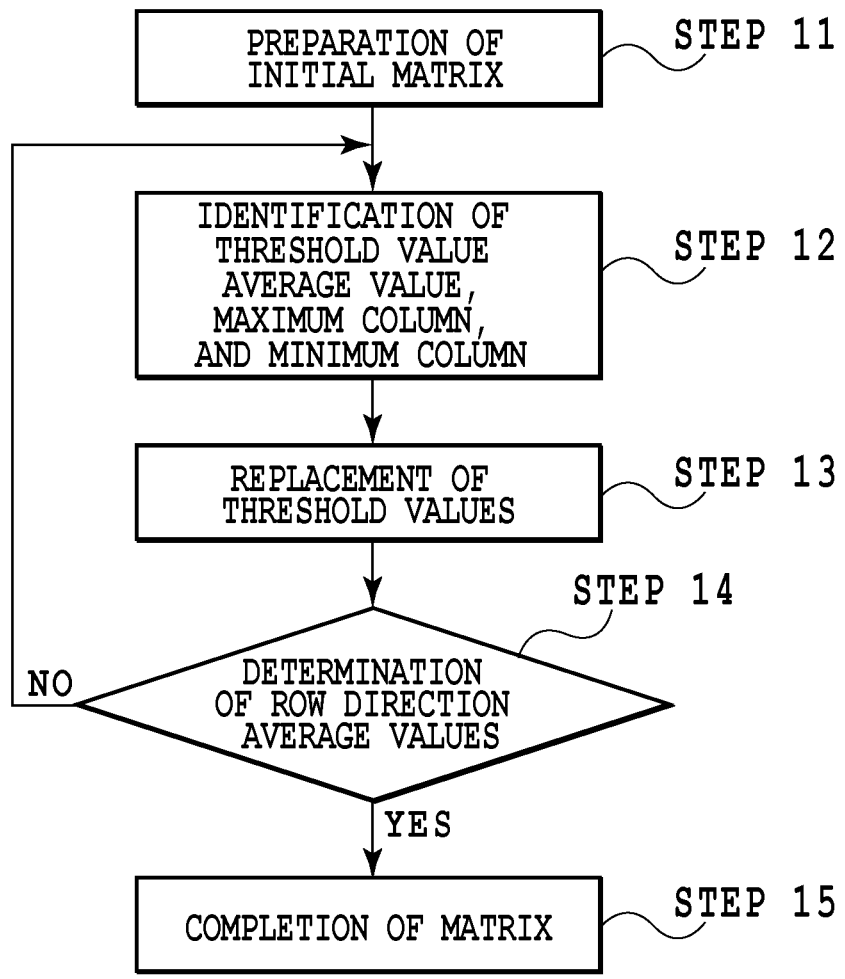
FIG. 19 is a flowchart for explaining another example of a method for generating a threshold value matrix.

FIG. 19 is a flowchart for explaining another example of a method for generating a threshold value matrix usable in the present invention. When this process is started, first, in Step 11, a 32×16 initial matrix is prepared. The initial matrix is prepared with use of values obtained by giving noise values having a step size of 1 within a range of ±32 (−32, −31, −30, . . . , +30, +31, +32) to a reference threshold value of 128. That is, the initial matrix is configured to have values of (96, 97, 98, . . . , 158, 159, 160).

The step of preparing the initial matrix is specifically described. First, the above 32 values are generated with use of random numbers to prepare a first row matrix. Then, an average value of the 32 values is calculated to determine whether or not the average value is 128, and if the average value is 128, the row matrix is temporarily set. If the average value is not 128, random numbers are regenerated to prepare another first row matrix. Such preparation and determination are repeated until the average value becomes equal to 128. After the first row matrix has been temporarily set, a second row matrix is then temporarily set in the same manner as that for the first row. Subsequently, the above step is repeated until a sixteenth row matrix is set, and consequently the 32×16 initial matrix is completed.

After the initial matrix has been completed in Step 11, in Step 12, average values in the respective columns of the initial matrix are obtained. Then, a column of which an average value is maximum, and a column of which an average value is minimum are selected.

In subsequent Step 13, one predetermined row is selected from the sixteen rows constituting the initial matrix, and then in the row, a value of the column having the maximum average value and a value of the column having the minimum average value are replaced by each other. The above one predetermined row is set such that a difference between said maximum average value and said minimum average value is minimized by the replacement.

Further, in Step 14, it is determined whether or not all of average values in the 32 columns are 128. If any of all of the average values in the 32 columns is not 128, the flow returns to Step 12 to repeat Steps 12 to 14 until all of the average values in the columns become equal to 128. If all of the average values in the columns become equal to 128, a matrix at this stage is determined to be the threshold value matrix, and then this process is finished.

Figure 20:
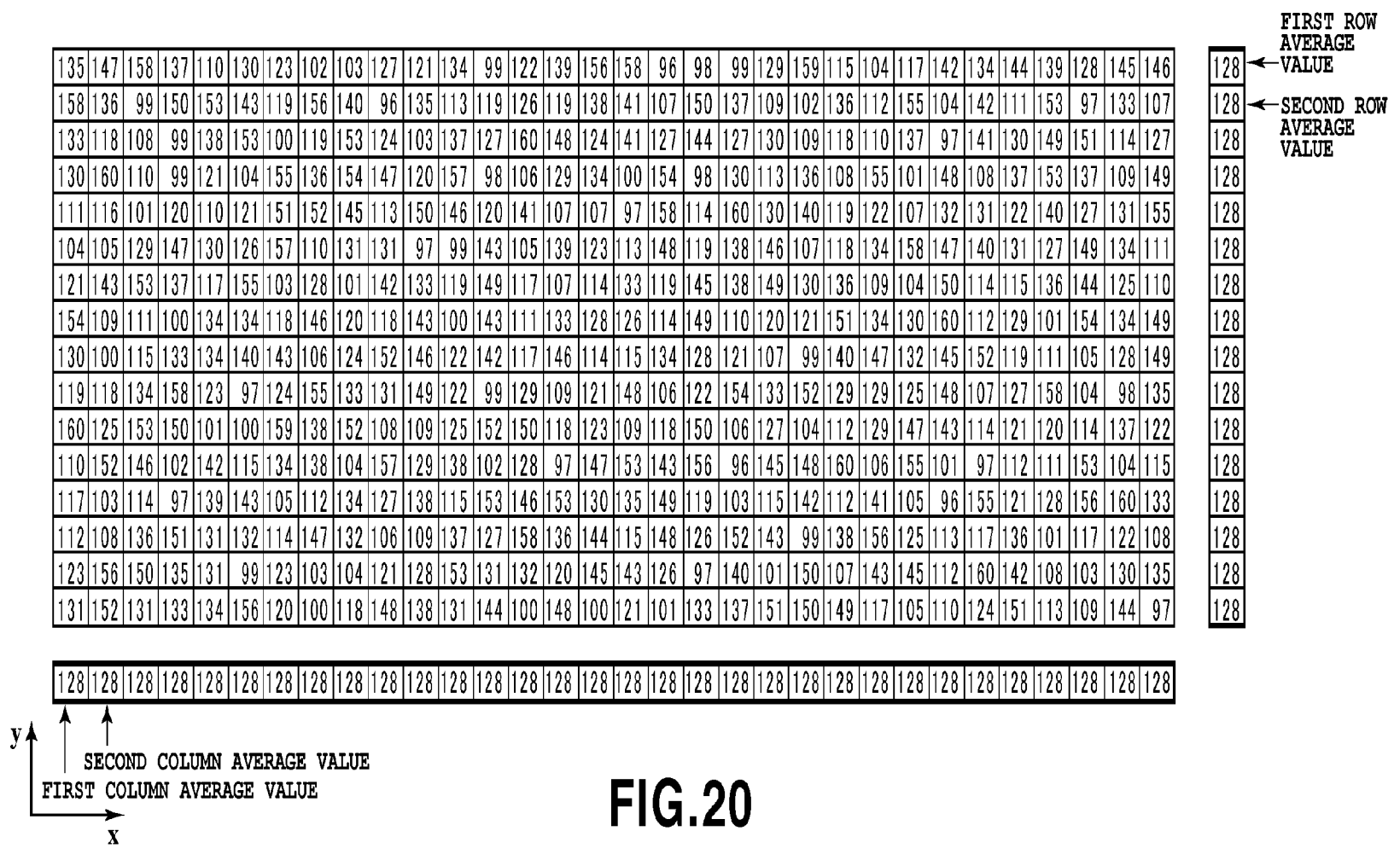

FIG. 20 is one example of the threshold value matrix obtained according to the flowchart in FIG. 19. In the case of using such a threshold value matrix to perform the error diffusion process, average values of threshold values in all columns and rows can be equally adjusted to 128 with threshold values for respective pixels being varied. Therefore, as compared with the first embodiment, a further improved image can be expected.

Also, in the above first and second embodiments, described is the 2-pass multipass printing that uses the mask patterns illustrated in FIG. 5 to print odd-numbered columns and even-numbered columns by different scans; however, it should be appreciated that the present invention is not limited to such multipass printing.

FIG. 21 is a diagram illustrating another example of mask patterns applicable for the 2-pass multipass printing in the present invention. FIG. 22 is a diagram in which in the case of using the mask patterns illustrated in FIG. 21 to perform the 2-pass printing of the binary data illustrated in FIG. 10, dot data printed by the first pass and dot data printed by the second pass are respectively illustrated. Even in the case of using such mask patterns, as in FIG. 11 described in the first embodiment, dot sparseness and denseness are not recognized.

The mask patterns illustrated in FIG. 5 or 21 are one example of mask patterns applicable for the 2-pass printing, and in the present embodiment, any mask patterns are applicable if the mask patterns have a mutually complementary relationship. Also, even in the case of multipass printing other than 2-pass printing, in combination with the threshold value matrix having the above-described characteristic, the effect of the present invention can be produced to output a good image.

Further, in the any of the above embodiments, describes is that, by using the characteristic threshold value matrix of the present invention, without performing the rotation as in Japanese Patent Laid-Open No. 2004-120133, a pattern or sweeping phenomenon specific to the error diffusion can be avoided with a small memory capacity. However, the present invention does not exclude the configuration of Japanese Patent Laid-Open No. 2004-120133. Even though using the characteristic threshold value matrix in the present invention, while performing the rotation described in Japanese Patent Laid-Open No. 2004-120133 on the matrix, setting a threshold value for each pixel enables the pattern or sweeping phenomenon specific to the error diffusion to be further effectively suppressed by collaborative operation of the both.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-012988, filed Jan. 25, 2011, which is hereby incorporated by reference herein in its entirety.

What is claimed is:

1. An image processing method, executed by an image processing apparatus, for performing a quantization process of multivalued image data into a lower level N-value (N is an integer equal to or more than 2) by an error diffusion process, the image processing method comprising:

inputting multivalued image data of an image;

an obtaining step of adding an error from a peripheral pixel to the multivalued image data of a target pixel of an image to obtain a correction value;

a setting step of, from a threshold value matrix configured such that different values are arrayed in a row array and in a column array, selecting one value according to a pixel position of the target pixel in the image to set a threshold value for comparing with the correction value, the row consisting of pixels corresponding to values in the row array and the column consisting of pixels corresponding to values in the column array intersecting;
a quantization step of, according to a result of comparing the threshold value set in the setting step with the correction value obtained in the obtaining step, outputting N-value data;
a diffusion step of diffusing an error between the correction value and the N-value data, the error occurring in association with the quantization step, in a peripheral pixel position where the quantization step has not been performed; and
outputting a value indicating printing or non-printing of the target pixel,
wherein in the threshold value matrix, average values in respective rows or average values in respective columns are almost a same value.

2. The image processing method according to claim 1, wherein the threshold value matrix is configured such that different threshold values for comparing with the correction value are arrayed in the row and the column, and in the setting step, according to a pixel position of the multivalued image data, one of the threshold values is selected and set from the threshold value matrix.

3. The image processing method according to claim 1, wherein the threshold value matrix is configured such that different components for setting differences from a threshold value serving as a reference are arrayed in the row and in the column, and in the setting step, according to a pixel position of the multivalued image data, one of the components is selected from the threshold value matrix, and on a basis of the component and the threshold value serving as a reference, the threshold value for comparing with the correction value is set.

4. The image processing method according to claim 1, wherein the N-value is a 2-value.

5. The image processing method according to claim 1, wherein the N-value is a 3-value or more, the image processing method further comprising:
a step of, from a plurality of dot patterns each in which printing or non-printing of a dot is preliminarily set for each of m×k areas, selecting one dot pattern according to the N-value data outputted by the quantization step, and thereby converting the N-value data to binary data,
wherein regarding the plurality of dot patterns, a plurality of dot patterns are prepared for each of one level value of the N-value data.

6. The image processing method according to claim 1, wherein the image processing method is a method for printing an image by ejecting ink according to the N-value data output in the quantization step while relative movement of a nozzle array, in which a plurality of nozzles for ejecting ink are arrayed in a predetermined direction, in a direction crossing to the predetermined direction with respect to a print medium,
wherein the predetermined direction corresponds to the column and the crossing direction corresponds to the row.

7. The image processing method according to claim 6, wherein a printing for a unit area of the print medium is performed by a plurality of the relative movements of the nozzle array, and
ink ejecting is allowed for every other column in each of the relative movements and the column which is allowed to print is changed for each of the relative movement.

8. The image processing method according to claim 1, wherein in the threshold value matrix, the average values in respective rows are almost the same value.

9. The image processing method according to claim 1, wherein in the threshold value matrix, the average values in respective columns are almost the same value.

10. The image processing method according to claim 1, wherein in the threshold value matrix, the average values in respective rows and the average values in respective columns are almost the same value.

11. An image processing method, executed by an image processing apparatus, for performing a quantization process of multivalued image data into a lower level N-value (N is an integer equal to or more than 2) by an error diffusion process, the image processing method comprising:
inputting multivalued image data of an image;
an obtaining step of adding an error from a peripheral pixel to the multivalued image data of a target pixel of an image to obtain a correction value;
a setting step of, from a threshold value matrix configured such that different values are arrayed in a row array and in a column array, selecting one value according to a pixel position of the target pixel in the image to set a threshold value for comparing with the correction value, the row consisting of pixels corresponding to values in the row array and the column consisting of pixels corresponding to values in the column array intersecting;
a quantization step of, according to a result of comparing the threshold value set in the setting step with the correction value obtained in the obtaining step, outputting N-value data;
a diffusion step of diffusing an error between the correction value and the N-value data, the error occurring in association with the quantization step, in a peripheral pixel position where the quantization step has not been performed; and
outputting a value indicating printing or non-printing of the target pixel,
wherein in the threshold value matrix, average values in respective rows or average values in respective columns are included in a range of ±15% of an average value of them.

12. The image processing method according to claim 11, wherein in the threshold value matrix, the average values in the respective rows and the average values in the respective columns are included in a range of ±10% of an average value of them.

13. The image processing method according to claim 11, wherein the image processing method is a method for printing an image by ejecting ink according to the N-value data output in the quantization step while relative movement of a nozzle array, in which a plurality of nozzles for ejecting ink are arrayed in a predetermined direction, in a direction crossing to the predetermined direction with respect to a print medium,
wherein the predetermined direction corresponds to the column and the crossing direction corresponds to the row.

14. The image processing method according to claim 13, wherein a printing for a unit area of the print medium is performed by a plurality of the relative movements of the nozzle array, and
ink ejecting is allowed for every other column in each of the relative movements and the column which is allowed to print is changed for each of the relative movements.

15. The image processing method according to claim 11, wherein in the threshold value matrix, the average values in respective rows are almost the same value.

16. The image processing method according to claim 11, wherein in the threshold value matrix, the average values in respective columns are almost the same value.

17. The image processing method according to claim 11, wherein in the threshold value matrix, the average values in respective rows and the average values in respective columns are almost the same value.

18. An image processing method, executed by an image processing apparatus, for performing a quantization process of multivalued image data into a lower level N-value (N is an integer equal to or more than 2) by an error diffusion process, the image processing method comprising:

inputting multivalued image data of an image;

an obtaining step of adding an error from a peripheral pixel to the multivalued image data of a target pixel of an image to obtain a correction value;

a setting step of, from a threshold value matrix configured such that different values are arrayed in a row array and in a column array, selecting one value according to a pixel position of the target pixel in the image to set a threshold value for comparing with the correction value, the row consisting of pixels corresponding to values in the row array and the column consisting of pixels corresponding to values in the column array intersecting;

a quantization step of, according to a result of comparing the threshold value set in the setting step with the correction value obtained in the obtaining step, outputting N-value data;

a diffusion step of diffusing an error between the correction value and the N-value data, the error occurring in association with the quantization step, in a peripheral pixel position where the quantization step has not been performed; and outputting a value indicating printing or non-printing of the target pixel, wherein in the threshold value matrix, a variation among average values in respective rows or a variation among average values in respective columns are kept low as compared with a case of generating random numbers to prepare the different values.

19. The image processing method according to claim 18, wherein the image processing method is a method for printing an image by ejecting ink according to the N-value data output in the quantization step while relative movement of a nozzle array, in which a plurality of nozzles for ejecting ink are arrayed in a predetermined direction, in a direction crossing to the predetermined direction with respect to a print medium, wherein the predetermined direction corresponds to the column and the crossing direction corresponds to the row.

20. The image processing method according to claim 19, wherein a printing for a unit area of the print medium is performed by a plurality of the relative movements of the nozzle array, and ink ejecting is allowed for every other column in each of the relative movements and the column which is allowed to print is changed for each of the relative movements.

21. The image processing method according to claim 18, wherein in the threshold value matrix, the average values in respective rows are almost the same value.

22. The image processing method according to claim 18, wherein in the threshold value matrix, the average values in respective columns are almost the same value.

23. The image processing method according to claim 18, wherein in the threshold value matrix, the average values in respective rows and the average values in respective columns are almost the same value.

24. An image processing apparatus for performing a quantization process of multivalued image data into a lower level N-value (N is an integer equal to or more than 2) by an error diffusion process, the image processing apparatus comprising:

a processor executing:

inputting multivalued image data of an image;

an obtaining step of adding an error from a peripheral pixel to the multivalued image data of a target pixel of an image to obtain a correction value;

a setting step of, from a threshold value matrix configured such that different values are arrayed in a row array and in a column array, selecting one value according to a pixel position of the target pixel in the image to set a threshold value for comparing with the correction value, the row consisting of pixels corresponding to values in the row array and the column consisting of pixels corresponding to values in the column array intersecting;

a quantization step of, according to a result of comparing the threshold value set by the setting step with the correction value obtained by the obtaining step, outputting N-value data;

a diffusion step of diffusing an error between the correction value and the N-value data, the error occurring in association with the quantization step, in a peripheral pixel position where the quantization step has not been performed; and outputting a value indicating printing or non-printing of the target pixel, wherein in the threshold value matrix, average values in respective rows or average values in respective columns are almost a same value.

25. The image processing apparatus according to claim 24, wherein the image processing apparatus is for printing an image by ejecting ink according to the N-value data output in the quantization step while relative movement of a nozzle array, in which a plurality of nozzles for ejecting ink are arrayed in a predetermined direction, in a direction crossing to the predetermined direction with respect to a print medium, wherein the predetermined direction corresponds to the column and the crossing direction corresponds to the row.

26. The image processing apparatus according to claim 25, wherein a printing for a unit area of the print medium is performed by a plurality of the relative movements of the nozzle array, and ink ejecting is allowed for every other column in each of the relative movements and the column which is allowed to print is changed for each of the relative movements.

27. The image processing apparatus according to claim 24, wherein in the threshold value matrix, the average values in respective rows are almost the same value.

28. The image processing apparatus according to claim 24, wherein in the threshold value matrix, the average values in respective columns are almost the same value.

29. The image processing apparatus according to claim 24, wherein in the threshold value matrix, the average values in respective rows and the average values in respective columns are almost the same value.

* * * * *